UNITED STATES PATENT OFFICE.

EMIL FISCHER, OF BERLIN, GERMANY, ASSIGNOR TO SYNTHETIC PATENTS CO., INC. OF NEW YORK, N. Y., A CORPORATION OF NEW YORK.

PHARMACEUTICAL PRODUCT CONTAINING ARSENIC.

1,178,708.     Specification of Letters Patent.     Patented Apr. 11, 1916.

No Drawing.     Application filed November 27, 1914. Serial No. 874,308.

*To all whom it may concern:*

Be it known that I, EMIL FISCHER, doctor of philosophy, professor of chemistry, citizen of the German Empire, residing at Berlin, Germany, have invented new and useful Improvements in Pharmaceutical Products Containing Arsenic, of which the following is a specification.

The phenylpropiolic acid

$$C_6H_5-C{\equiv}C-COOH$$

possesses the property hitherto not yet observed that on being heated with halogen compounds of arsenic it combines with these products. The new products thus obtained are absorbed in the digestive organs and appear therefore to be valuable for therapeutic purposes. The products thus obtained contain halogen in addition to arsenic. They are whitish to brownish crystalline compounds practically insoluble in water and soluble in acetone. Upon treatment with weak alkalis the halogen is split off and alkali salts of new products are obtained, which are likewise valuable for therapeutic purposes.

In order to illustrate the new process more fully the following examples are given, the parts being by weight:—

Example 1: 20 parts of phenylpropiolic acid and 50 parts of arsenic trichlorid (AsCl$_3$) are heated during 24 hours to 100° C. From the mass of the reaction the new substance separates in the shape of leaflets which are washed with ether and recrystallized from this liquid. Colorless crystals result containing about 16 per cent. arsenic and 14.5 per cent. chlorin. My new product is insoluble in water and soluble in hot acetone, chloroform and benzene, soluble with more difficulty in ether.

Example 2: 20 parts of phenylpropiolic acid and 80 parts of arsenic tribromid (AsBr$_3$) are heated during about twenty-four hours to 100° C. From the mass of the reaction the new substance is isolated by washing with ether to which petrolether is subsequently added. In this way crystals are precipitated which are purified by recrystallization from benzol. The resulting new acid containing arsenic and bromin is insoluble in water, almost insoluble in petrolether and soluble in acetone and benzol.

In order to convert the above products into another valuable product either of said products is then dissolved at 0° C. in 8 parts of 1.5 normal caustic potash lye. Into the filtered liquid a current of CO$_2$ is introduced. A crystalline precipitate being an acid potassium salt containing water of crystallization separates, which is collected on a filter and is recrystallized from 10 parts of hot water. After drying the salt is a colorless powder containing (after being freed from the water of crystallization) about 17 per cent. of arsenic and being free from halogen. On being heated with an excess of alkali on the water bath As$_2$O$_3$ is split off.

The analogous product obtained from phenylpropiolic acid and PBr$_3$ forms yellowish-brown crystals melting at from 255–258° C. It is insoluble in water, soluble in acetone and benzene. Acid potassium and acid sodium salts of products containing arsenic are obtained from it as above described.

I claim:—

1. The herein described new phenylpropiolic acid compounds containing arsenic and halogen, which are crystalline whitish to brownish compounds practically insoluble in water and soluble in acetone, halogen being split off therefrom upon treatment with dilute caustic alkalis, alkali salts of arsenic compounds being obtained, substantially as described.

2. The herein described new phenylpropiolic acid compounds containing arsenic and chlorin, which are crystalline whitish compounds practically insoluble in water and soluble in acetone, chlorin being split off therefrom upon treatment with dilute caustic alkalis, alkali salts of arsenic compounds being obtained, substantially as described.

3. The herein described new product being a phenylpropiolic acid compound containing arsenic and chlorin, which is a whitish crystalline compound insoluble in water and soluble in hot acetone, chloroform and benzene, chlorin being split off therefrom upon treatment with normal caustic potash lye, an acid potassium salt being obtained containing about 17 per cent. of arsenic and being free from chlorin, substantially as described.

In testimony wherof I have hereunto set my hand in the presence of two subscribing witnesses.

EMIL FISCHER.

Witnesses:
 WOLDEMAR HAUPT,
 HENRY HASPER.